United States Patent [19]
Ruegg et al.

[11] Patent Number: 5,836,258
[45] Date of Patent: Nov. 17, 1998

[54] METHOD AND APPARATUS FOR INCINERATING WASTE MATERIAL USING OXYGEN INJECTION

[75] Inventors: Hans Ruegg, Wohlen; Thomas Ungricht, Zurich, both of Switzerland

[73] Assignee: Von Roll Umwelttechnik AG, Zurich, Switzerland

[21] Appl. No.: 545,278

[22] Filed: Oct. 19, 1995

[30] Foreign Application Priority Data

Oct. 20, 1994 [CH] Switzerland .................. 03 153/94

[51] Int. Cl.$^6$ ...................................... F23G 5/00
[52] U.S. Cl. ...................... 110/346; 110/348; 110/258
[58] Field of Search .................... 110/346, 246, 110/258, 259, 210, 348

[56] References Cited

U.S. PATENT DOCUMENTS

| | | |
|---|---|---|
| 3,955,964 | 5/1976 | MacDonald et al. . |
| 4,292,073 | 9/1981 | Marukawa et al. . |
| 4,462,825 | 7/1984 | Messina . |
| 4,653,730 | 3/1987 | Wunsche et al. . |
| 5,179,902 | 1/1993 | Vojtech ................................ 110/248 |
| 5,505,145 | 4/1996 | Gross et al. ........................ 110/248 |

*Primary Examiner*—Henry A. Bennett
*Assistant Examiner*—Susanne C. Tinker
*Attorney, Agent, or Firm*—Oblon, Spivak, McClelland, Maier & Neustadt, P.C.

[57] ABSTRACT

A method and apparatus for incinerating loose waste material in which the loose waste material is introduced into a furnace chamber to form a layer in the bottom of the furnace chamber. The layer of loose waste material is subjected to the direct action of technical-grade oxygen, preferably in less than stoichiometric amounts, with the oxygen fed at least at the speed of sound. The oxygen is supplied utilizing a plurality of lances distributed in the furnace chamber. Heat produced by combustion of the waste material melts incombustible constituents of the waste material. Residual unburnt combustible gases can be fed through an outlet stack to a secondary combustion chamber.

16 Claims, 2 Drawing Sheets

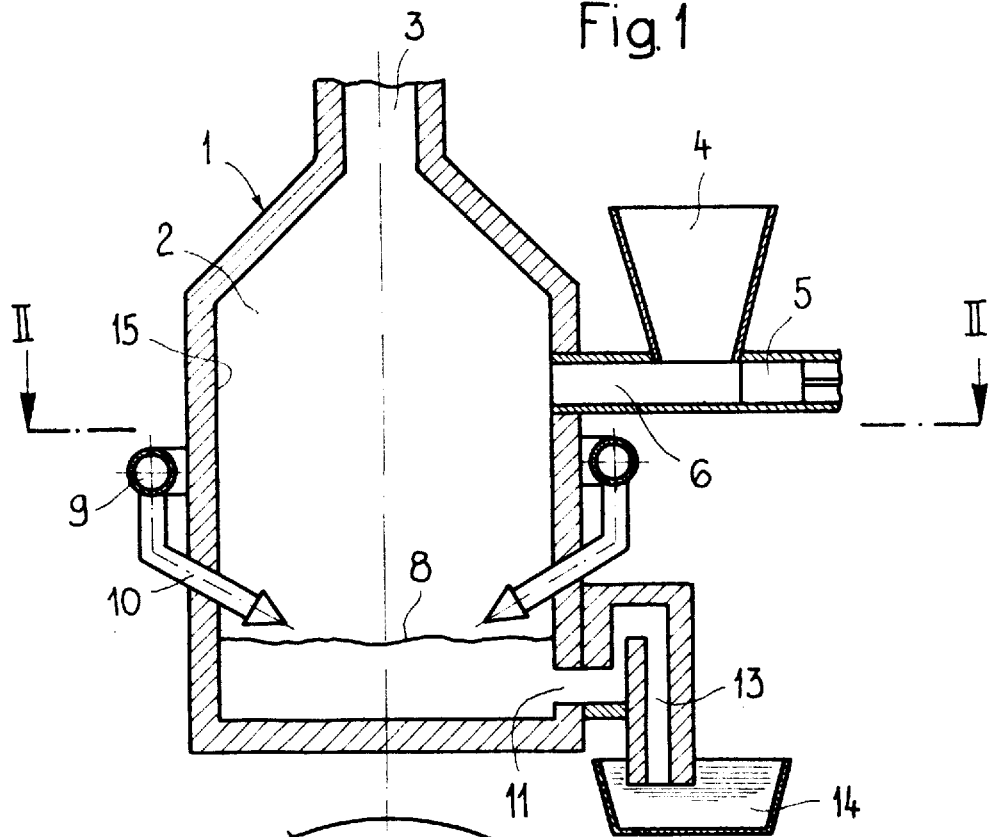
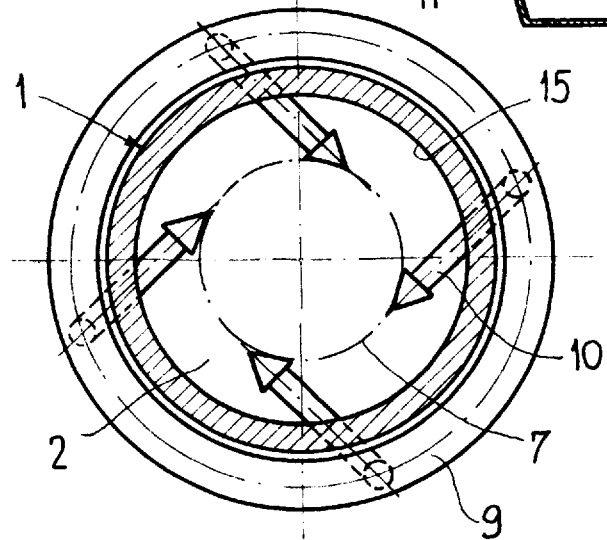

METHOD AND APPARATUS FOR INCINERATING WASTE MATERIAL USING OXYGEN INJECTION

FIELD OF THE INVENTION

The invention relates to a method and apparatus for incinerating loose waste material, and particularly for incinerating refuse.

DISCUSSION OF BACKGROUND

A method of incinerating loose waste material is known from CH-PS 482 988, in which the loose waste material is first dried and heated in a first chamber and then melted in a second chamber, i.e., at a separate location. When the waste materials are placed in the second chamber or melting chamber they are uniformly distributed over the cylindrical periphery of the chamber. For the incineration of the combustible constituents, preheated combustion agents, for example preheated air, are introduced tangentially into the melting chamber together with combustible liquid waste materials or fuels. This method has not been successful even if the combustion agent is intensely heated, because it has not been possible to achieve sufficiently high temperatures required for melting in the melting chamber.

CH-PS 432 703 teaches the melting of a thin layer of predried, preheated waste materials in a melting chamber, with the introduction of additional fuels and combustion agents. However, the use of extraneous fuels makes this method expensive and therefore not economically practicable.

SUMMARY OF THE INVENTION

It is an object of the present invention to provide a more economical incineration method and apparatus which does not require extraneous fuels, and nevertheless achieves required melting temperatures without difficulty.

In accordance with the present invention, it was surprisingly found that by subjecting the layer of loose waste material, formed on the bottom or along a side wall of the furnace chamber, to the direct action of oxygen alone (i.e., without additional liquid fuels), sufficient heat for melting the waste materials is generated. According to the invention, the oxygen is fed at at least the speed of sound, and the turbulence thus obtained in the layer of waste material effects complete combustion and melting of the waste material. In accordance with another advantageous aspect of the invention, the drying, combustion and melting of the waste material take place without requiring preliminary treatment of the waste material such that a single chamber can be utilized, without the addition of liquid fuels, and the furnace for applying the method can have a simple construction. Two exemplary embodiments of an apparatus for applying the method of the present invention are disclosed herein and illustrated in the drawings.

BRIEF DESCRIPTION OF THE DRAWINGS

A more complete appreciation of the invention and many of the attendant advantages thereof will become readily apparent from the following detailed description, particularly when considered in conjunction with the drawings in which:

FIG. 1 shows a vertical cross-section of a furnace chamber according to a first exemplary embodiment;

FIG. 2 shows a partial horizontal cross-section along line II—II in FIG. 1;

DESCRIPTION OF THE PREFERRED EMBODIMENTS

Figure 3:
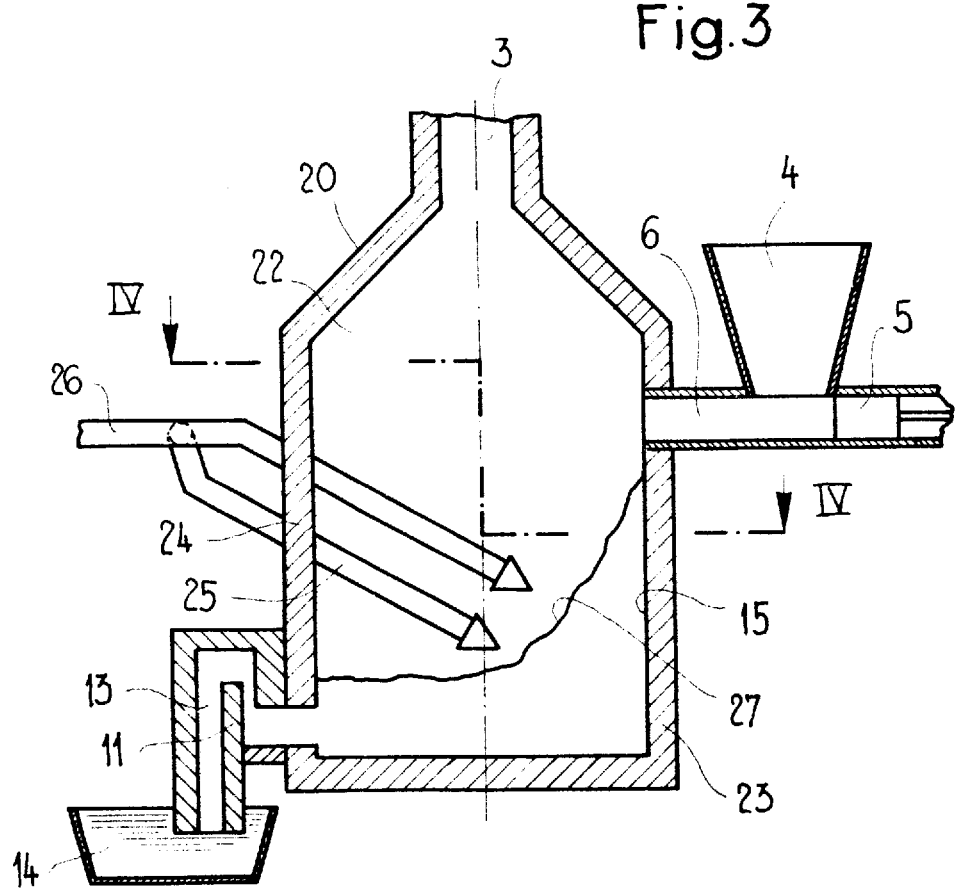
FIG. 3 shows a vertical cross-section of a furnace chamber according to a second exemplary embodiment.

Referring to FIGS. 1 and 2, an example of a furnace according to the present invention is shown. The furnace 1 includes a cylindrical furnace chamber 2, which tapers conically to a gas outlet stack 3 at the top. In its interior the furnace 1 is equipped, in a manner known in the art, with a refractory wall lining which is not shown in detail and which is schematically designated at 15. The waste material is filled into a filling hopper 4 in a manner not illustrated in detail and, by means of a ram 5, is delivered through a filling duct 6 leading into the side of furnace chamber 2. An annular chamber 9 is provided on the periphery of the furnace 1, to supply a plurality of lances 10 with technical-grade oxygen. The lances extend or lead obliquely, and in the same direction, tangential to an imaginary circle 7 (FIG. 2), into the furnace chamber 2, and are directed directly onto a surface 8 of the layer of waste material situated in the bottom region of the furnace chamber 2. The filling duct 6 is disposed above the lances 10.

The bottom region of the melting furnace 1 is provided with a side outlet aperture 11 for the liquid slag, with the aperture 11 connected via a duct 13 to a water bath 14.

Figure 4:
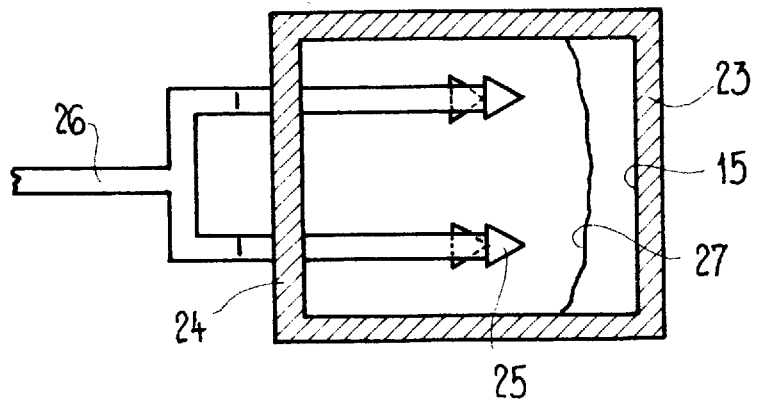
FIG. 4 shows a partial horizontal cross-section along line IV—IV in FIG. 3.

In the exemplary embodiment of a furnace 20 illustrated in FIGS. 3 and 4, identical parts having the same or similar functions are designated with the same reference numerals as utilized in the embodiment according to FIGS. 1 and 2. In this embodiment the furnace 20 and the furnace chamber 22 have a rectangular construction. The furnace chamber 22 also tapers towards the gas outlet stack 3 in the top region of the furnace chamber. The filling duct 6 leads into the side of a wall 23, while in the opposite wall 24 are arranged lances 25, which introduce the technical-grade oxygen into the furnace chamber 22. Each lance 25 has a forked structure which is directed onto the surface 27 of the layer of waste material falling from the filling duct 6. A plurality of lances 25 are uniformly distributed along the wall 24 and are arranged in a plurality of rows lying one above the other. In FIGS. 3 and 4, two pairs of lances 25 are, for example, distributed one above the other along the wall 24. The oxygen supply pipe common to all the lances 25 is designated at 26.

In the method according to the invention for incineration of waste material, for example refuse, the waste material to be incinerated is fed loose into the furnace chamber 2 or 22, without any special thermal pretreatment, such as preheating or predrying. Depending upon the nature of the waste material and the dimensions of the filling duct 6, at most previous elimination of excessively large pieces of waste material might be considered. In the furnace chamber 2 or 22, the surface 8 or 27 of the layer of waste material is subjected to the direct action of technical-grade oxygen (93%) via the lances 10 or 25. Through the heat produced in the consequent combustion of combustible constituents of the waste material, incombustible, meltable constituents of the waste material are melted. The oxygen is fed at a speed which at least attains the speed of sound (in a manner known per se, and not illustrated in detail in the drawing), for example in accordance with the Venturi principle. The intense turbulence thus produced in the layer of waste material effects complete combustion and melting-down of the waste material.

The oxygen is preferably fed in less than stoichiometric amounts so as to achieve better mastery or control of the temperature pattern in the melting region. The combustible gases formed in this case are fed via the gas outlet stack 3 to a secondary combustion chamber (not shown in the drawing) and subjected therein to secondary combustion.

In addition to the main or primary combustion on the surface 8 or 27 of the layer of waste material in the furnace chamber 2 or 22, additional gas combustion can be effected above the layer of waste material, for example by the additional supply of oxygen into that region of the furnace chamber 2 or 22 which is situated above the inlet duct 6 (not illustrated in the drawing). This additional thermal action effects radiation of the heat produced in the gas combustion downwardly onto the layer of waste material and increases the efficiency of the method according to the invention.

In the exemplary embodiment illustrated in FIGS. 1 and 2, a rotational movement is imparted to the melt through the tangential feeding of the oxygen in the region of the imaginary circle 7, whereby good mixing, rapid melting and uniform combustion are ensured. Moreover, since the lances 10 discharge the oxygen at a distance from the wall lining 15, movement of the waste material near the wall is minimal, such that the thermal and mechanical load on the wall lining 15 are minimized.

In the second embodiment according to FIGS. 3 and 4, there is formed on the bottom, and obliquely along the wall 23 situated opposite the lances 25, a layer of waste material by which the wall 23 lying thereunder is insulatingly protected against the action of the heat. The melt flowing down in this case is fed, in the same way as in the furnace 1 according to the first exemplary embodiment, via the outlet aperture 11 and the duct 13 to the water bath 14, at which it is granulated and discharged and passed on in a manner known per se and not illustrated in detail.

In the method according to the invention the amount of oxygen fed is controlled, and preferably optimized, depending upon, for example, the temperature in the furnace chamber 2 or 22 and/or on the amount of waste material introduced and/or the quality or type of waste material.

The method according to the invention and also the apparatuses for applying it as illustrated in the drawings, are suitable not only for processing of non-pretreated waste material, but also for the thermal treatment of waste material or refuse which has already been subjected to pyrolysis. For example, waste material already freed of volatile, combustible substances in a degasification process (also called pyrolysis) in a known rotary tubular furnace or on a degasification grate (Swiss patent application no. 01 510/94-8; A 10364 CH) with the introduction of oxidizing agents, can be fed as refuse coke to the furnace chamber 2 or 22. The unburnt volatile substances produced during degasification (in the rotary tubular furnace or on the degasification grate) can be subjected to secondary combustion either in a separate secondary combustion chamber, or can be combusted together with the combustible gases drawn off from the furnace chamber 2 or 22, in a secondary combustion chamber (not shown) connected downstream of the gas outlet stack 3. In addition, the gases drawn off from the furnace chamber 2 or 22 may also be used as a heating agent for a pyrolysis process. Together with the refuse or with the pyrolyzed waste material, slag may additionally be introduced into the furnace 1 or 22 and integrated into the melt.

Although in the figures lateral feeding of the waste material has been illustrated in each case, alternate waste material feed arrangements can also be utilized. For example, the waste material can be fed into the top region of the furnace, and can be fed axially. Further, particularly when relatively large pieces exist, it is advantageous to comminute the waste material before it is fed into the furnace.

The economy of the method according to the invention is to be seen not only in the fact that it requires no additional fuels, but also in the fact that at the relatively high temperatures little waste gas is produced, and it is thus possible to be implemented with smaller plant units.

Obviously, numerous additional modifications and variations of the present invention are possible in light of the above teachings. It is therefore to be understood that the invention may be practiced otherwise than specifically described herein.

What is claimed as new and desired to be secured by Letters Patent of the United States is:

1. A method for incinerating loose refuse waste material in which incombustible constituents of the refuse waste material are drawn off as a melt comprising:
   providing a furnace chamber;
   introducing loose refuse waste material into the furnace chamber to form a layer of loose refuse waste material; and
   introducing oxygen toward the layer of refuse waste material at a speed of at least the speed of sound to burn combustible constituents of the refuse waste material such that burning of said combustible constituents provides a melting heat to melt remaining constituents of the refuse waste material.

2. A method as recited in claim 1, wherein the oxygen is fed in less than stoichiometric amounts.

3. A method as recited in claim 1, wherein the step of introducing loose waste material includes forming on a bottom of the furnace chamber a layer of refuse waste material, and the step of introducing oxygen includes directing oxygen at the layer to act on the layer utilizing a plurality of lances distributed in the furnace.

4. A method as recited in claim 3, further including providing the furnace chamber as a cylindrical furnace chamber, and disposing said lances to discharge oxygen tangentially into the cylindrical furnace chamber with the lances discharging oxygen in a same rotational direction in order to impart a rotational movement to the melt.

5. A method as recited in claim 3, further including providing said furnace chamber as a rectangular furnace chamber, and the step of introducing loose refuse waste material includes introducing loose refuse waste material on a bottom and obliquely along a wall of the furnace chamber, with a surface of the refuse waste material directly acted upon by the plurality of lances, and wherein the lances are uniformly distributed.

6. A method as recited in claim 1, further including providing a gas outlet stack for the furnace chamber, and feeding combustible gases formed in the furnace chamber through said gas outlet stack to a secondary combustion process location.

7. A method as recited in claim 1, further including providing an additional supply of oxygen above the layer of refuse waste material in the furnace chamber such that, in addition to combustion at the surface of the layer of refuse waste material, additional gas combustion occurs above the surface of the layer of refuse waste material, with heat from the additional gas combustion radiated onto the layer of refuse waste material.

8. A method as recited in claim 1, further including providing the loose refuse waste material in the form of a refuse coke which has been freed of volatile substances in a pyrolysis furnace.

9. A method as recited in claim 1, further including introducing a slag into the furnace chamber in addition to introducing the loose refuse waste material.

10. A method as recited in claim 8, further including feeding combustible gases formed in the furnace chamber through a gas outlet stack, and combining the combustible gases with volatile combustible substances formed in the pyrolysis furnace for a secondary combustion process.

11. A method as recited in claim 8, further including feeding combustible gases formed in the furnace chamber through a gas outlet stack of the furnace chamber, and feeding the combustible gases to the pyrolysis furnace such that the combustible gases act as a heating agent for the pyrolysis furnace.

12. A method as recited in claim 1, further including controlling an amount of oxygen supplied to the furnace chamber based upon at least one of a temperature in the furnace chamber, an amount of refuse waste material in the furnace chamber, and a type of refuse waste material introduced into the furnace chamber.

13. A method as recited in claim 1, further including comminuting the refuse waste material prior to introducing the refuse waste material into the furnace chamber.

14. A method as recited in claim 1, wherein the step of introducing oxygen includes introducing oxygen to produce sufficient turbulence in the layer of refuse waste material to effect combustion of the combustible constituents of the refuse waste material.

15. A method as recited in claim 14, wherein the step of introducing oxygen effects combustion of said combustible constituents without utilizing additional fuels.

16. A method as recited in claim 1, wherein the step of introducing oxygen effects combustion of said combustible constituents without utilizing additional fuels.

* * * * *